March 18, 1924.

G. A. BURNHAM

TIME LIMIT DEVICE

Filed Nov. 22, 1918

1,487,439

Inventor:
George A. Burnham
by
B. J. Noyes atty

Patented Mar. 18, 1924.

1,487,439

UNITED STATES PATENT OFFICE.

GEORGE A. BURNHAM, OF SAUGUS, MASSACHUSETTS, ASSIGNOR TO SEARS B. CONDIT, JR., OF BROOKLINE, MASSACHUSETTS.

TIME-LIMIT DEVICE.

Application filed November 22, 1918. Serial No. 263,755.

*To all whom it may concern:*

Be it known that I, GEORGE A. BURNHAM, a citizen of the United States, residing in Saugus, in the county of Essex and State of Massachusetts, have invented an Improvement in Time-Limit Devices, of which the following is a specification.

My invention relates to time limit devices and has more particular reference to the means for connecting the movable member of the solenoid, or electrically operated member of the current responsive element with the movable member of the dash pot or other retarding element of such device.

In time limit devices of the type in which the movable element or core of a solenoid is associated with a dash pot which serves to retard the upward movement of the movable element when said solenoid is sufficiently energized, to thereby delay the movement of the movable element of the solenoid, the dash pot is usually directly connected to the core or movable element of the solenoid.

The action of such a device, when the coil is energized only to an amount at which it begins to move its movable element or core, or is energized only to a slight amount in excess of the particular value at which the core is designed to move, is not positive. With such an energization of the solenoid the force acting upon the movable element thereof to cause it to move is very small and consequently the action of the device, when the core of the solenoid is at its lowest position and is just beginning to move, is very uncertain. When, however, the core has moved upward to some extent, the force acting upon the core is increased, and consequently a more positive operation of the device results and there is then a definite and positive pull upon the movable element of the damping device, or the piston of the dash pot.

The object of my invention is the provision of means so arranged that, when the energization of the solenoid is at the critical point for which the apparatus is set to operate or when the energization of the coil is but a slight amount in excess of such critical value, the movable element of the solenoid will exert a direct and positive pull upon the movable element of the retardation device whereby there is a positive and definite action of said device at the beginning of its operation as well as in a partly operated position.

I accomplish this object of my invention by the provision of a variable leverage in the connections between the movable element, or core, of the solenoid and movable element, or piston, of the retardation device, the variable leverage being such that at the beginning of the movement of the core of the solenoid, the core is connected for greatest advantage with the piston of the retardation device whereby the small force with which the solenoid acts upon the core at the beginning of its movement is multiplied into a comparatively large force which acts upon the movable element of the retardation device and a positive movement is given said element. The variable leverage mechanism connected between the solenoid and retardation device is so arranged that, as the core of the solenoid is moved upward, the advantage of the core in regard to the movable element of the retardation device is diminished since, in any such partially operated positions of the core of the solenoid, the forces acting upon said core are greater and the necessity for the increased advantage no longer exists.

The variable leverage is accomplished by the provision of a lever connected with the movable element of the retardation device having a cam surface which is adapted to be engaged by the cam surface of a second lever operated by the movable element of the solenoid. Said levers and cam surfaces are so arranged that at the beginning of the movement of the movable element of the solenoid said movable element has a great advantage over the movable element of the retardation device and as such movable element is moved within the solenoid the cam surfaces contact with each other in such a way that the advantage is diminished.

In the usual type of time limit device, as above set forth, after the movable element of the solenoid has moved upward within the solenoid to some extent the force acting upon the movable element is greatly increased and consequently the piston of the dash pot is pulled up at an increasing rate which thereby results in a short period of operation of the device. With the above described connecting means between the movable element of the solenoid and the dash pot, and by properly shaping the co-acting cam surfaces, the resistance offered by the piston of the dash pot to the movement of the core of the solenoid may be increased in proportion to the increased force acting on the core, and a long time period of operation may thereby result, which is a further object of my invention.

As here shown the time limit device includes the solenoid 10 the energization of which may be controlled from any particular circuit to be protected. A core 11 is movably arranged within said solenoid to be moved upward therein upon the sufficient energization of said coil.

Figure 1:
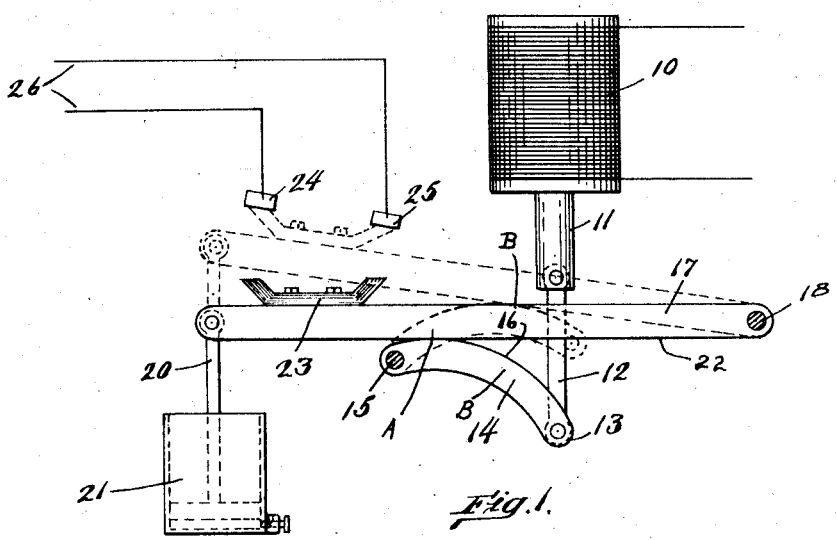
Fig. 1 is a representation of a time limit device embodying my invention.

In the modification shown in Fig. 1 link 12 is pivotally connected to said core 11 and pivotally connected, at its other end 13, to a lever 14 which is pivoted at 15 to a stationary part of the device.

Said lever 14 may be arcuate in form as shown in Fig. 1 and its face 16 may form one of the cam surfaces by which the variable leverage is obtained.

A lever 17 is pivoted at 18 to a stationary part of the time limit device and extends above said arcuate lever 14 and its other end 19 is pivotally connected to the movable element 20, here shown conventionally as the piston of the dash pot 21.

Said lever 17 may be substantially straight and its lower face 22 is adapted to form the cam surface to be engaged by the arcuate cam surface of the lever 14 operated by the current responsive device.

Said lever 17 may bear a spring brush 23 which, in the upwardly moved position of said lever, may serve to connect or bridge the contacts 24 and 25 to thereby close a circuit 26 for the control of apparatus connected thereto.

In an unenergized condition of the device the core 11 of the solenoid is at its lowest position and the lever 17 of the retardation device may be in contact with the cam lever 14 of the solenoid at a point A adjacent the fulcrum 15 of said lever. In this position, the core 11 of the solenoid has the greatest advantage over the piston 20 of the retardation device since its advantage may be measured by the distance from the point of contact A to the fulcrum 18. As the core 11 of the solenoid is moved upward, due to the effective energization of said solenoid, the cam surfaces of the levers 14 and 17 contact at different points and at another partially moved position of the mechanism may contact at a point B. In this particular position the advantage of the core of the solenoid over the piston of the retardation device is less, being measured by the distance from the point of contact B to the fulcrum 18 which is less than the distance from the initial point of contact A to the fulcrum 18 and as the core of the solenoid is progressively moved upward the advantage of said core over the piston of the dash pot becomes progressively less due to the shape of cam surfaces shown.

Figure 2:
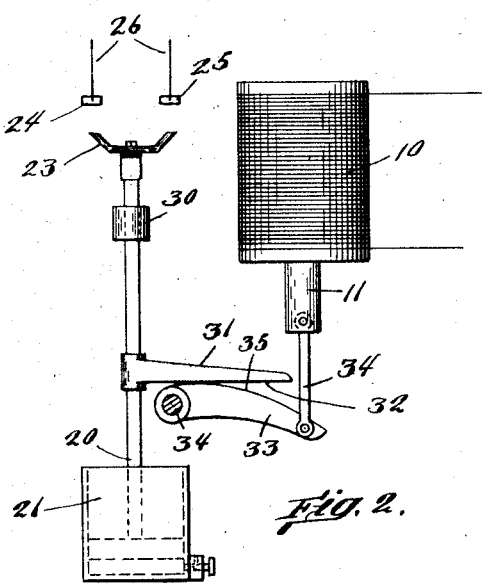
Fig. 2 is a modification of a time limit device embodying my invention.

In the modification shown in Fig. 2, the piston 20 of the dash pot 21 is guided in its movements in a straight line by a bearing 30 and an arm 31 is secured thereto. Said arm is provided with a cam face 32 formed on its lower side perpendicular to the direction of movement of the piston. A lever 33 is pivoted at 34 adjacent the piston 20 and beneath the cam arm 31 and is pivotally connected through the link 34 with the movable elements 11 of the current responsive device.

Said lever 33 has a cam surface 35 arranged to be in contact with the cam surface 32 of the arm 31 and a movement of the core 11 is transmitted through said cam surfaces to said piston 20.

The arrangement of said arm and lever is such that at the beginning of the movement of the core 11 the cam surfaces contact adjacent the fulcrum 34 of the lever thereby giving a great advantage to said core 11. As said core moves upward the point of contact of said cam surfaces moves outwardly from said fulcrum and the advantage consequently decreases, thereby producing the same result as with the construction shown in Fig. 1.

Whereas, with the cam surfaces shown in Fig. 1 there may be a relative movement or slipping therebetween with consequent loss of power and resulting in an uncertain operation of the device, with the cam surfaces shown in Fig. 2 there is designed to be a pure rocking motion of the cams without slipping and consequently the uncertain operation of the device, due to slipping is obviated.

I claim:

1. A retardation device arranged to control an electric circuit including the combination of a retarding element having a movable member, a solenoid having a core movable therein adapted to operate the movable member of said retarding element, means connecting said core and movable member including co-acting cam members associated with said core and movable member arranged to be moved progressively into contact with each other and provide an initially great advantage of said core over said movable member and thereafter a progressively decreasing advantage as said core is moved within said solenoid and an electric switch arranged to be operated by said device.

2. A time limit device comprising a solenoid, a movable member controlled thereby, a lever movable by said movable member having a cam surface, a retardation element, a movable member controlled thereby, a lever having a cam surface associated with said movable member, the cam surfaces of said levers contacting for the transmission of a movement of the movable member of said solenoid to the member of the retardation device, and said cam surfaces providing the solenoid an initially great advantage over the retardation element and a subsequent lesser advantage during the operation of the device.

In testimony whereof, I have signed my name to this specification, in the presence of two subscribing witnesses.

GEORGE A. BURNHAM.

Witnesses:
T. T. GREENWOOD,
H. B. DAVIS.